United States Patent
Sugaya

(10) Patent No.: US 8,743,221 B2
(45) Date of Patent: Jun. 3, 2014

(54) IMAGE CAPTURE APPARATUS AND CONTROL METHOD THEREOF

(75) Inventor: Tomohiro Sugaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 13/180,125

(22) Filed: Jul. 11, 2011

(65) Prior Publication Data

US 2012/0033092 A1   Feb. 9, 2012

(30) Foreign Application Priority Data

Aug. 9, 2010  (JP) .................. 2010-179006

(51) Int. Cl.
*H04N 5/232*   (2006.01)

(52) U.S. Cl.
USPC ............... 348/208.99; 348/208.1; 348/208.4

(58) Field of Classification Search
None
See application file for complete search history.

(56) References Cited

U.S. PATENT DOCUMENTS

| | | | |
|---|---|---|---|
| 6,734,901 B1 | 5/2004 | Kawahara et al. | |
| 7,522,188 B2 | 4/2009 | Tomita et al. | |
| 7,583,889 B2 | 9/2009 | Miyasako | |
| 2005/0128309 A1* | 6/2005 | Tomita et al. | 348/208.7 |

FOREIGN PATENT DOCUMENTS

| | | |
|---|---|---|
| JP | 2005-141207 A | 6/2005 |
| JP | 4419466 | 2/2010 |

OTHER PUBLICATIONS

U.S. Appl. No. 13/173,127, filed Jun. 30, 2011.
Morio Onoe, et al., Image Registration by the Sequential Similarity Detection Algorithm. Information Processing Society of Japan, vol. 17, No. 7, pp. 634-640, Jul. 1976 (Full English Translation).
These references were cited in an Sep. 11, 2013 U.S. Notice of Allowance, which is not enclosed, that issued in related U.S. Appl. No. 13/173,127.

* cited by examiner

*Primary Examiner* — Twyler Haskins
*Assistant Examiner* — Angel L Garces-Rivera
(74) *Attorney, Agent, or Firm* — Cowan, Liebowitz & Latman, P.C.

(57) ABSTRACT

An image capture apparatus comprises an image capture unit, a shake detection unit, a reference value calculation unit, an image blur correction unit, a motion vector detection unit, a determination unit which determines whether the motion vector indicates a movement of an object, and a control unit which controls one of the calculation methods of the reference value and the reference value, wherein the reference value calculation unit calculates the reference value using both an output from the shake detection unit and an output from the motion vector detection unit as one of the plurality of calculation methods, and when the determination unit determines that the motion vector indicates the movement of the object, the control unit controls not to calculate the reference value using the output from the shake detection unit and the output from the motion vector detection unit.

10 Claims, 19 Drawing Sheets

FIG. 11

| | | IMAGE CAPTURE APPARATUS STATE X | | | |
|---|---|---|---|---|---|
| | | 1 (STILL STATE) | 2 (FIXED POINT SHOOTING STATE) | 3 (RIGHT PANNING STATE) | 4 (LEFT PANNING STATE) |
| CAPTURED IMAGE STATE U | 1 | STILL STATE MOTION VECTOR = REMAINING BLUR | FIXED POINT SHOOTING STATE MOTION VECTOR = REMAINING BLUR | PANNING STATE MOTION VECTOR = OBJECT MOVEMENT | PANNING STATE MOTION VECTOR = OBJECT MOVEMENT |
| | 2 | STILL STATE MOTION VECTOR = OBJECT MOVEMENT | FIXED POINT SHOOTING STATE MOTION VECTOR = REMAINING BLUR | PANNING STATE MOTION VECTOR = OBJECT MOVEMENT | PANNING STATE MOTION VECTOR = OBJECT MOVEMENT |
| | 3 | STILL STATE MOTION VECTOR = OBJECT MOVEMENT | FIXED POINT SHOOTING STATE MOTION VECTOR = OBJECT MOVEMENT | PANNING STATE MOTION VECTOR = REMAINING BLUR | PANNING STATE MOTION VECTOR = OBJECT MOVEMENT |
| | 4 | STILL STATE MOTION VECTOR = OBJECT MOVEMENT | FIXED POINT SHOOTING STATE MOTION VECTOR = OBJECT MOVEMENT | PANNING STATE MOTION VECTOR = OBJECT MOVEMENT | PANNING STATE MOTION VECTOR = REMAINING BLUR |

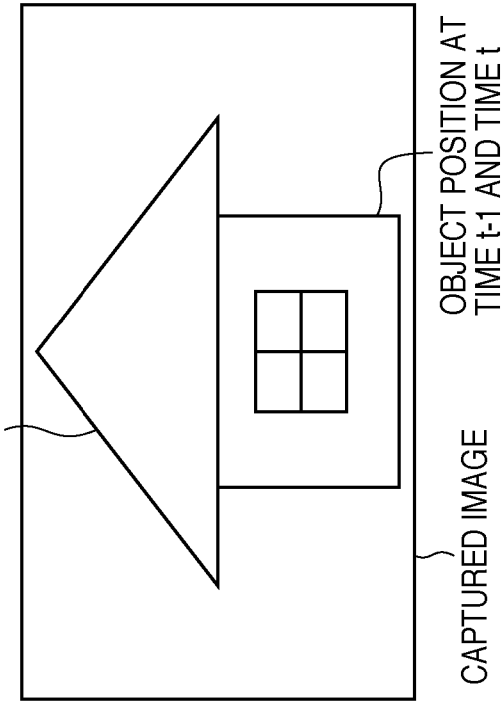
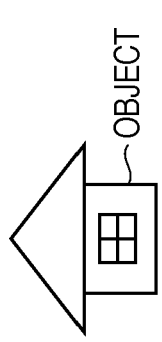

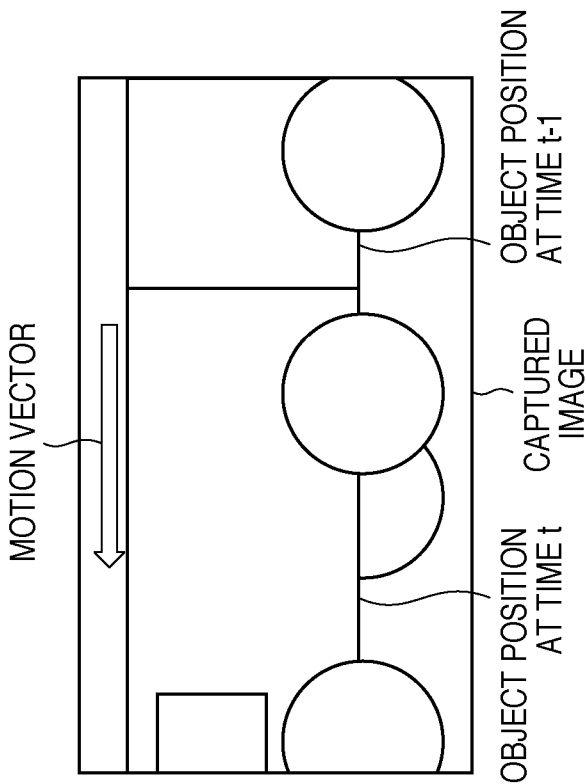
F I G. 13B
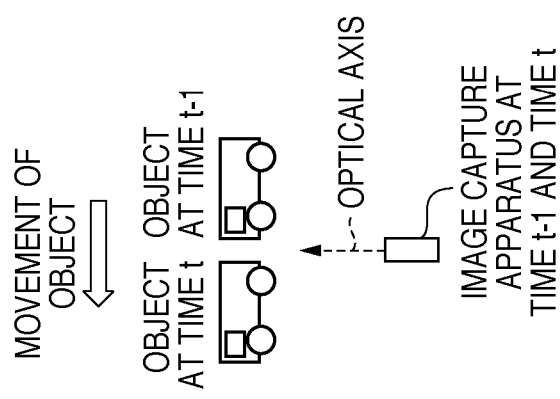
F I G. 13A

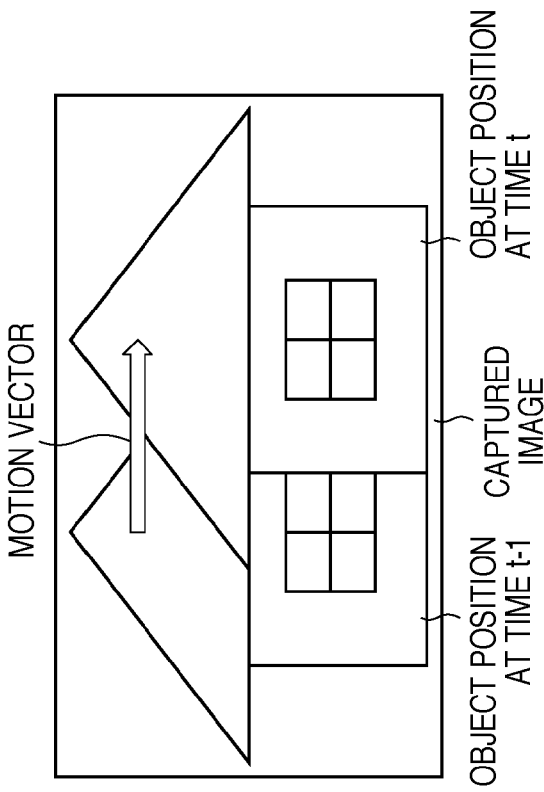
F I G. 15B
CAPTURED IMAGE
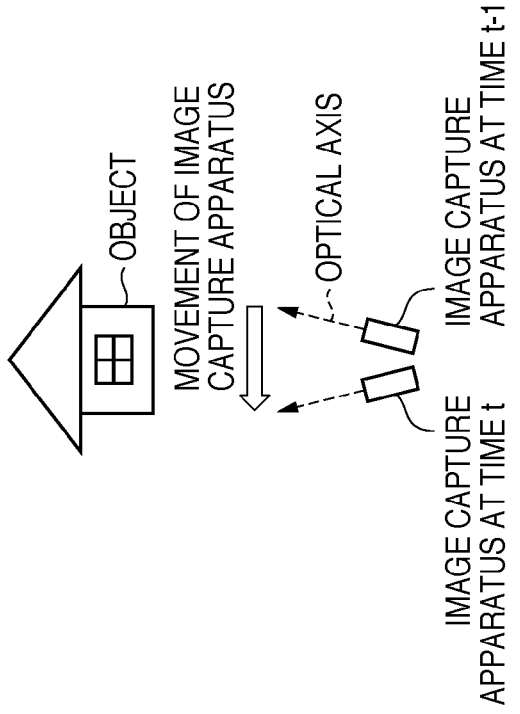
F I G. 15A
SHOOTING STATE

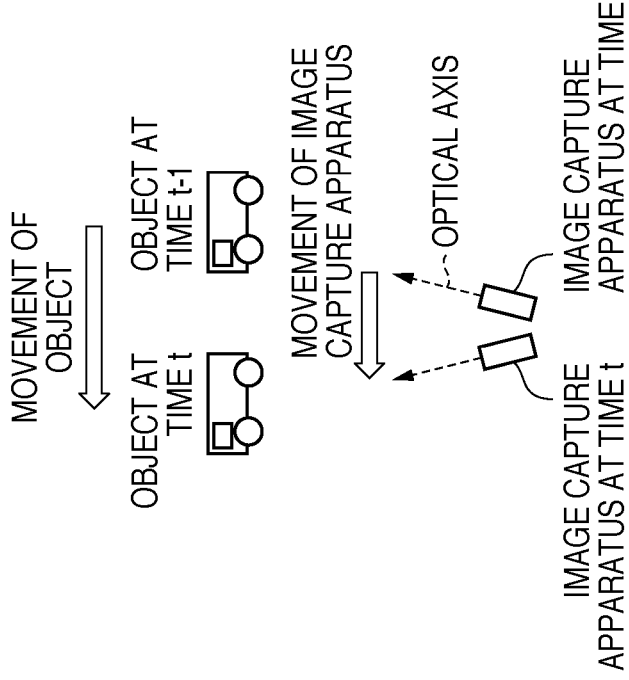
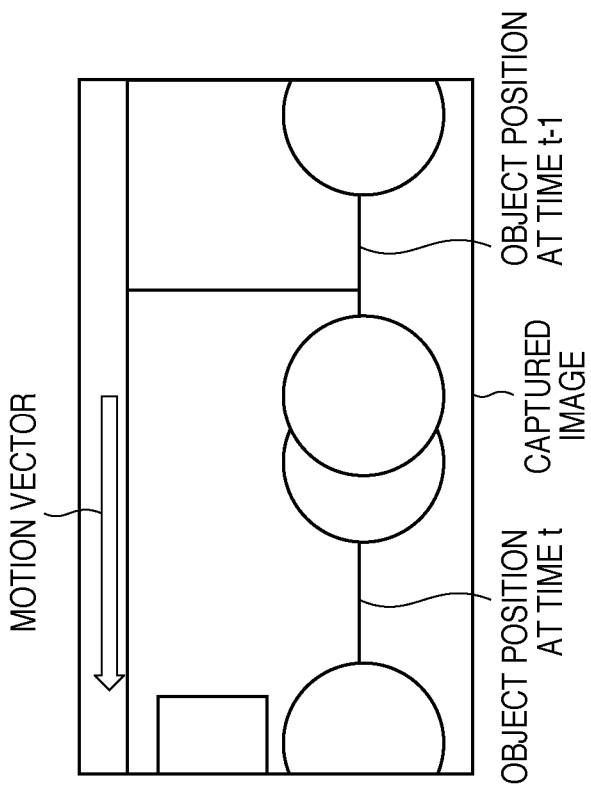

F I G. 18
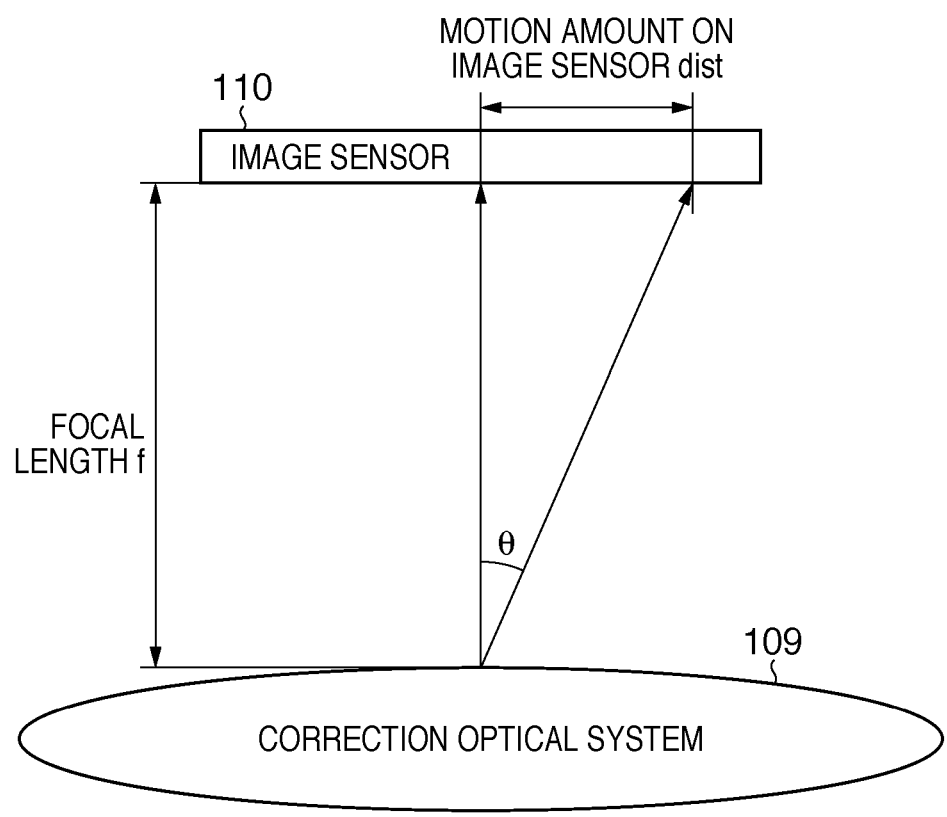

FIG. 22

| | | IMAGE CAPTURE APPARATUS STATE X | | | |
|---|---|---|---|---|---|
| | | 1 (STILL STATE) | 2 (FIXED POINT SHOOTING STATE) | 3 (RIGHT PANNING STATE) | 4 (LEFT PANNING STATE) |
| CAPTURED IMAGE STATE U | 1 | STILL STATE MOTION VECTOR = REMAINING BLUR | FIXED POINT SHOOTING STATE MOTION VECTOR = REMAINING BLUR | PANNING STATE MOTION VECTOR = OBJECT MOVEMENT | PANNING STATE MOTION VECTOR = OBJECT MOVEMENT |
| | 2 | STILL STATE MOTION VECTOR = OBJECT MOVEMENT | FIXED POINT SHOOTING STATE MOTION VECTOR = REMAINING BLUR | PANNING STATE MOTION VECTOR = OBJECT MOVEMENT | PANNING STATE MOTION VECTOR = OBJECT MOVEMENT |
| | 3 | STILL STATE MOTION VECTOR = OBJECT MOVEMENT | FIXED POINT SHOOTING STATE MOTION VECTOR = OBJECT MOVEMENT | PANNING STATE MOTION VECTOR = REMAINING BLUR | PANNING STATE MOTION VECTOR = OBJECT MOVEMENT |
| | 4 | STILL STATE MOTION VECTOR = OBJECT MOVEMENT | FIXED POINT SHOOTING STATE MOTION VECTOR = OBJECT MOVEMENT | PANNING STATE MOTION VECTOR = OBJECT MOVEMENT | PANNING STATE MOTION VECTOR = REMAINING BLUR |
| | 5 | STILL STATE MOTION VECTOR = OBJECT MOVEMENT | FIXED POINT SHOOTING STATE MOTION VECTOR = OBJECT MOVEMENT | PANNING STATE MOTION VECTOR = OBJECT MOVEMENT | PANNING STATE MOTION VECTOR = OBJECT MOVEMENT |

IMAGE CAPTURE APPARATUS AND CONTROL METHOD THEREOF

BACKGROUND OF THE INVENTION

1. Field of the Invention

The present invention relates to an image capture apparatus having an image stabilization function of correcting an image blur of a captured image caused by a camera shake or the like.

2. Description of the Related Art

Conventionally, image capture apparatuses such as a digital cameras use an angular velocity sensor or the like to detect a camera shake of the image capture apparatus. However, the reference value of the angular velocity sensor (output from the angular velocity sensor when the image capture apparatus does not shake) differs between individual angular velocity sensors.

To accurately detect a camera shake of the image capture apparatus, the reference value of the angular velocity sensor needs to be calculated. However, the reference value fluctuates depending on a factor such as temperature, so the fluctuation amount of the reference value needs to be always calculated.

A method of calculating the reference value is proposed in, for example, Japanese Patent No. 4419466.

However, the conventional reference value calculation method disclosed in Japanese Patent No. 4419466 has the following problems.

An error contained in a reference value calculated by a reference value calculation unit can be corrected using the motion vector only when the motion vector detects a remaining blur after blur correction of the image capture apparatus. For example, if the motion vector detects the movement of an object, using the motion vector may increase an error contained in the reference value rather than correct it.

If the motion vector cannot detect a remaining blur after blur correction of the image capture apparatus, as described above, using the motion vector in reference value calculation leads to an error contained in a calculated reference value, and accurate blur correction may fail.

SUMMARY OF THE INVENTION

The present invention has been made to solve the above problems, and corrects a blur of a captured image accurately.

According to the first aspect of the present invention, an image capture apparatus comprises an image capture unit which captures an object image to acquire a captured image, a shake detection unit which detects a shake of the image capture apparatus; a reference value calculation unit which calculates, by a plurality of calculation methods, a reference value for an output from the shake detection unit when no shake is applied to the image capture apparatus; an image blur correction unit which corrects an image blur of the captured image based on a difference between an output from the shake detection unit and the reference value; a motion vector detection unit which detects a motion vector from the captured image; a determination unit which determines whether the motion vector indicates a movement of an object; and a control unit which controls one of the calculation methods of the reference value and the reference value, wherein the reference value calculation unit calculates the reference value using both an output from the shake detection unit and an output from the motion vector detection unit as one of the plurality of calculation methods, and when the determination unit determines that the motion vector indicates the movement of the object, the control unit controls not to calculate the reference value using the output from the shake detection unit and the output from the motion vector detection unit.

According to the second aspect of the present invention, a method of controlling an image capture apparatus including an image capture unit which captures an object image to acquire a captured image, and an image blur correction unit for image stabilization, comprises detecting a shake of the image capture apparatus; calculating a reference value as a value output from a shake detection unit when no shake is applied to the image capture apparatus; driving an image blur correction unit based on a difference between an output from the shake detection unit and the reference value; detecting a motion vector from the captured image; determining whether the motion vector indicates a movement of an object; and controlling one of a calculation methods of the reference value and the reference value, wherein the reference value is calculated using both an output from the shake detection unit and an output from the motion vector detection unit as one of a plurality of calculation methods, and when the motion vector is determined to indicate the movement of the object, calculation of the reference value using the output from the shake detection unit and the output from the motion vector detection unit is controlled not to be performed.

Further features of the present invention will become apparent from the following description of exemplary embodiments with reference to the attached drawings.

BRIEF DESCRIPTION OF THE DRAWINGS

FIG. 11 is a table showing a list of shooting state determination results in step S105 of FIG. 2;

FIGS. 12A and 12B are views showing a shooting state and captured image when the image capture apparatus shakes slightly, the captured image blurs slightly, and the object is at rest;

FIGS. 13A and 13B are views showing a shooting state and captured image when the image capture apparatus shakes slightly, the captured image blurs greatly, and the object is moving;

FIGS. 15A and 15B are views showing a shooting state and captured image when the image capture apparatus shakes greatly, the captured image blurs greatly, and the object is at rest;

FIGS. 16A and 16B are views showing a shooting state and captured image when the image capture apparatus shakes greatly, the captured image blurs greatly, and the object is moving;

FIG. 18 is a view for explaining processing of converting MV into the same scale as that of GYRO;

FIG. 22 is a table showing a list of shooting state determination results in step S105 of FIG. 2.

DESCRIPTION OF THE EMBODIMENTS (First Embodiment)

Figure 1:
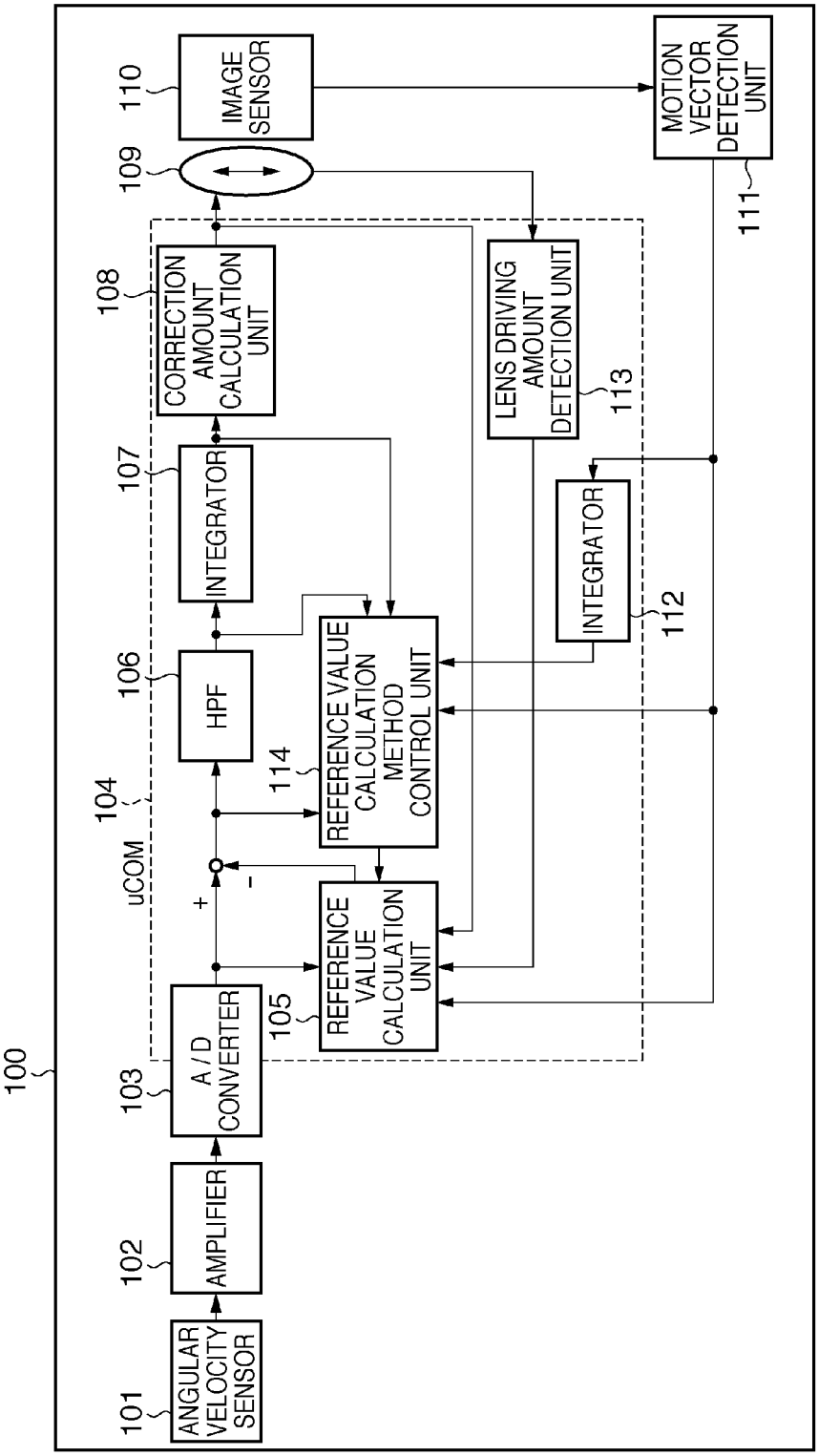
FIG. 1 is a block diagram showing the arrangement of an image capture apparatus according to the first embodiment of the present invention.

FIG. 1 is a block diagram showing the arrangement of an image capture apparatus according to the first embodiment of the present invention. The respective units and operation of an image capture apparatus 100 in FIG. 1 will be described in detail.

In the image capture apparatus 100 having an image stabilization function, an angular velocity sensor 101 calculates a shake of the image capture apparatus 100 as an angular velocity. An amplifier 102 amplifies an output from the angular velocity sensor 101. An A/D converter 103 digitizes an angular velocity output from the amplifier 102. The digital angular velocity output from the A/D converter 103, that is, angular velocity data is processed by a microcomputer μCOM 104. The μCOM 104 includes a reference value calculation unit 105, HPF 106, integrator 107, correction amount calculation unit 108, integrator 112, lens driving amount detection unit 113, and reference value calculation method control unit 114. The reference value calculation unit 105 calculates the reference value of the angular velocity sensor 101.

The reference value calculation unit 105 calculates the reference value in every predetermined period by one of the following methods 1 to 3.

(Reference Value Calculation Method 1)

The reference value is calculated using the integrated value of the angular velocity data in accordance with equation (1):

$$ref = d/dt\{sensor\_int - (correct\_blur + remain\_blur)\} \quad (1)$$

where d/dt is the differential, and ref is the reference value. sensor_int, correct_blur, and remain_blur will be described later.

(Reference Value Calculation Method 2)

The low-frequency component of the angular velocity data is extracted. Extraction of the low-frequency component uses a moving average value, low-pass filter, or the like.

(Reference Value Calculation Method 3)

A reference value calculated previously (in the past) is used as the reference value without calculating it.

The reference value calculation method control unit 114 to be described later controls one of reference value calculation methods (1) to (3) to be used to calculate the reference value by the reference value calculation unit 105.

(Reference value calculation method 1) will be explained. Angular velocity data is a value obtained by superposing a blur signal on a reference value. Letting ref be the reference value, blur be the blur angular velocity of the image capture apparatus 100, and sensor_int be the integrated value of angular velocity data in a predetermined period, sensor_int can be given by the following equation:

$$sensor\_int = \int blur + \int ref \quad (2)$$

correct_blur is a value obtained by converting a change of an output from the lens driving amount detection unit 113 into the tilt angle of the optical axis. Further, vector_int is the integrated value of an output from the motion vector detection unit 111 in a predetermined period. vector_int is a value indicating the motion amount of an image in a predetermined period. remain_blur is a value obtained by converting the motion amount into the tilt angle of the optical axis, and can be calculated as follows. Letting f be the focal length of the image capture apparatus 100, the following equation is established:

$$vector\_int = f \times remain\_blur$$

$$\therefore remain\_blur = vector\_int/f \quad (3)$$

where correct blur is an angle after blur correction by a correction optical system 109, and remain_blur is an angle which cannot be corrected by the correction optical system 109. Hence, the sum of correct_blur and remain_blur indicates the blur angle of the image capture apparatus 100. Since ∫blur on the right-hand side of equation (2) also represents the blur angle of the image capture apparatus 100, the following equation is established:

$$\int blur = correct\_blur + remain\_blur \quad (4)$$

Equations (2) and (4) yield the following equation:

$$\int ref = sensor\_int - (correct\_blur + remain\_blur) \quad (5)$$

Differentiation of both sides of equation (5) matches equation (1).

The reference value can be calculated according to equation (1) in a period (for example, 1/60 sec for the NTSC scheme) longer than the detection cycle of a motion vector detection unit 111. This period is much shorter than the fluctuation cycle of the reference value, and the calculation can follow fluctuations of the reference value without any delay.

However, equation (4) is not established if the motion vector detection unit 111 detects the movement of an object. Equation (1) is not established, either, and (reference value calculation method 1) cannot be adopted. At this time, if the image capture apparatus 100 stands still, (reference value calculation method 2) is employed. When no shake is applied to the image capture apparatus 100, even a method using the low-frequency component of angular velocity data can reduce an error contained in a calculated reference value to a negligible degree.

If (reference value calculation method 1) cannot be used and the image capture apparatus 100 does not stand still, the calculated reference value contains a large error even in the use of (reference value calculation method 2). In this case, a previously calculated reference value is used without calculating the reference value not to perform erroneous reference value calculation.

An actual blur, that is, actual angular velocity data in the image capture apparatus 100 can be acquired by subtracting a reference value calculated by the reference value calculation unit 105 from angular velocity data.

The HPF 106 cuts off the low-frequency component of actual angular velocity data and outputs the resultant data. The integrator 107 integrates the output from the HPF 106 and outputs the result as angular displacement data. The correction amount calculation unit 108 calculates the driving amount of the correction optical system 109 based on the angular displacement data. The correction optical system 109 is driven based on the driving amount to change the position of the optical axis of incident light on the image sensing plane of an image sensor 110 configured to sensor an object image, thereby optically correcting a blur generated in the captured image.

After blur correction by driving the correction optical system 109, a captured image acquired by the image sensor 110 is input to the motion vector detection unit 111, detecting the motion vector. The motion vector detection method is, for example, block matching which has conventionally been proposed.

Block matching is a method of dividing a captured image into regions called blocks, and detecting a similar portion between, for example, a captured image of the immediately preceding frame and the current captured image for each block. The displacement amount between an arbitrary block position in the current captured image and a similar block position in a captured image of the immediately preceding frame is obtained to detect movement information, that is, motion vector between the frames of the captured images. Based on the motion vector detected for each block, the motion vector of one frame is detected.

Note that block matching is an example of the motion vector detection method in the motion vector detection unit 111, and the motion vector detection method may be another method. Matching calculations are discussed in detail in Morio Onoe, et al., "Information Processing", Vol. 17, No. 7, pp. 634-640, July 1976.

The integrator 112 outputs the integrated value of the motion vector detected by the motion vector detection unit 111. The lens driving amount detection unit 113 detects and outputs the amount by which the correction optical system 109 has been driven actually. The reference value calculation method control unit 114 determines the state of the image capture apparatus 100 and that of the captured image, and changes the reference value calculation method in the reference value calculation unit 105 to one of (reference value calculation methods 1, 2, and 3) based on the determination result.

Determination of the state of the image capture apparatus by the reference value calculation method control unit 114 uses a value based on an output from the angular velocity sensor 101. Determination of the shooting state by the reference value calculation method control unit 114 uses a value based on an output from the motion vector detection unit 111. The angular velocity data-based value may be an output from the A/D converter 103, an output from the HPF 106, or an output from the integrator 107. The value based on an output from the motion vector detection unit 111 may be an output from the motion vector detection unit 111 or an output from the integrator 112.

[Processing Sequence of Reference Value Calculation Method Control Unit 114]

Figure 2:
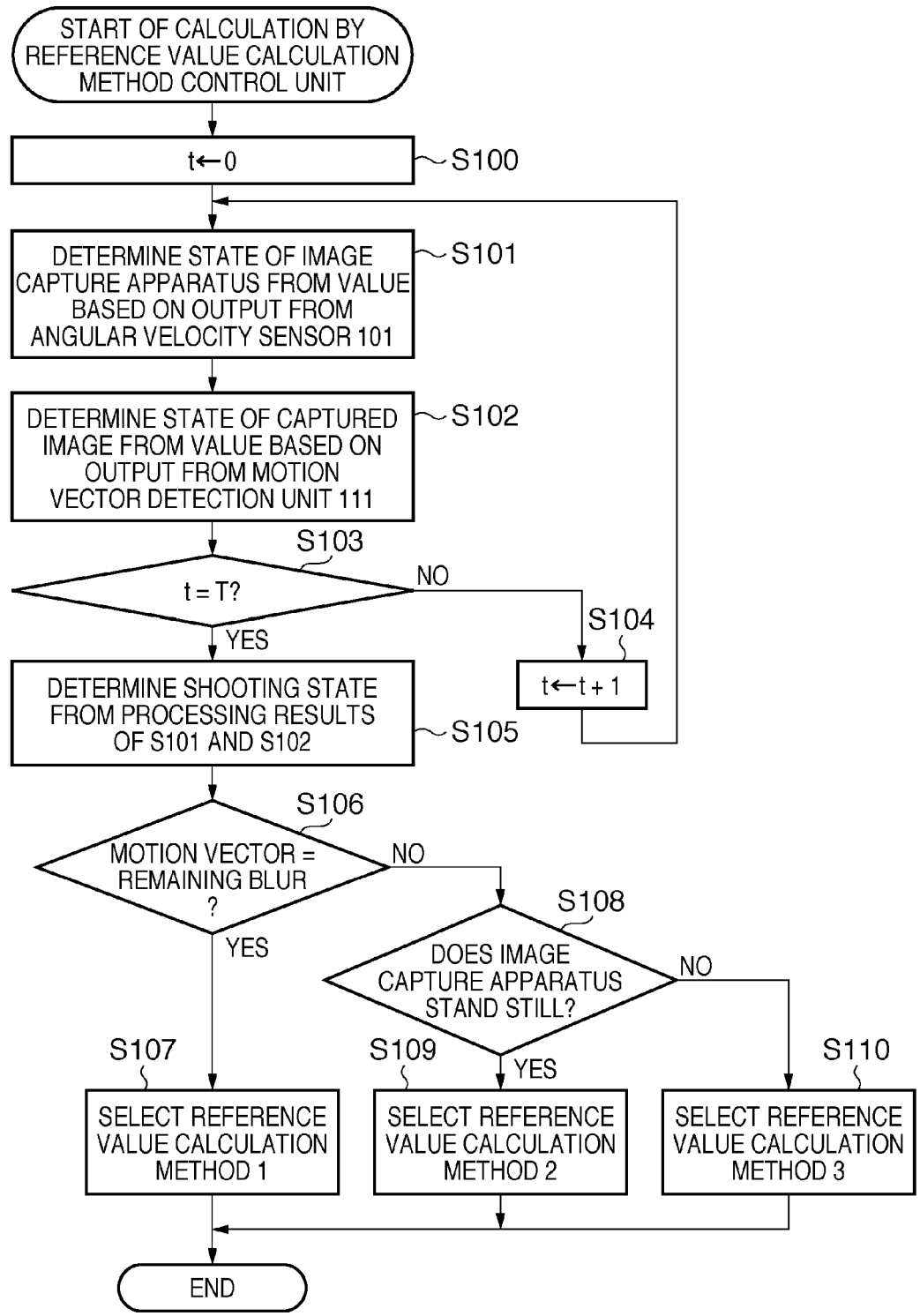
FIG. 2 is a flowchart for explaining processing performed by a reference value calculation method control unit.

Processing by the reference value calculation method control unit 114 will be explained with reference to FIG. 2. FIG. 2 is a flowchart showing processing by the reference value calculation method control unit 114. In FIG. 2, T is a processing cycle during which the reference value calculation method control unit 114 calculates the reference value.

In step S100, a processing count counter t in the reference value calculation unit 105 is set to 0. In step S101, the state of the image capture apparatus 100 is determined from a value based on an output from the angular velocity sensor 101. In step S102, the state of a blur generated in a captured image is determined from a value based on an output from the motion vector detection unit 111.

In step S103, it is determined whether the counter t becomes equal to the processing cycle T (within the predetermined period). If t≠T, the process shifts to step S104; if t=T, to step S105. In step S103, processing by the reference value calculation unit 105 and that by the reference value calculation method control unit 114 are synchronized with each other.

In step S104, the value of the counter t is incremented by one. In step S105, the shooting state is determined from the determination result of the state of the image capture apparatus 100 in step S101 and the captured image blur determination result in step S102.

In step S106, it is determined from the determination result in step S105 whether the motion vector indicates a remaining blur after blur correction in the image capture apparatus 100. If the motion vector indicates a remaining blur, the process shifts to step S107; if NO, to step S108. In step S107, (reference value calculation method 1) is selected as the reference value calculation method in the reference value calculation unit 105.

In step S108, it is determined from the determination result of the state of the image capture apparatus 100 in step S101 whether the image capture apparatus 100 stands still. If the image capture apparatus 100 stands still, the process shifts to step S109; if NO, to step S110.

In step S109, (reference value calculation method 2) is selected as the reference value calculation method in the reference value calculation unit 105. In step S110, (reference value calculation method 3) is selected as the reference value calculation method in the reference value calculation unit 105.

[Processing Sequence to Determine State of Image Capture Apparatus]

Figure 3:
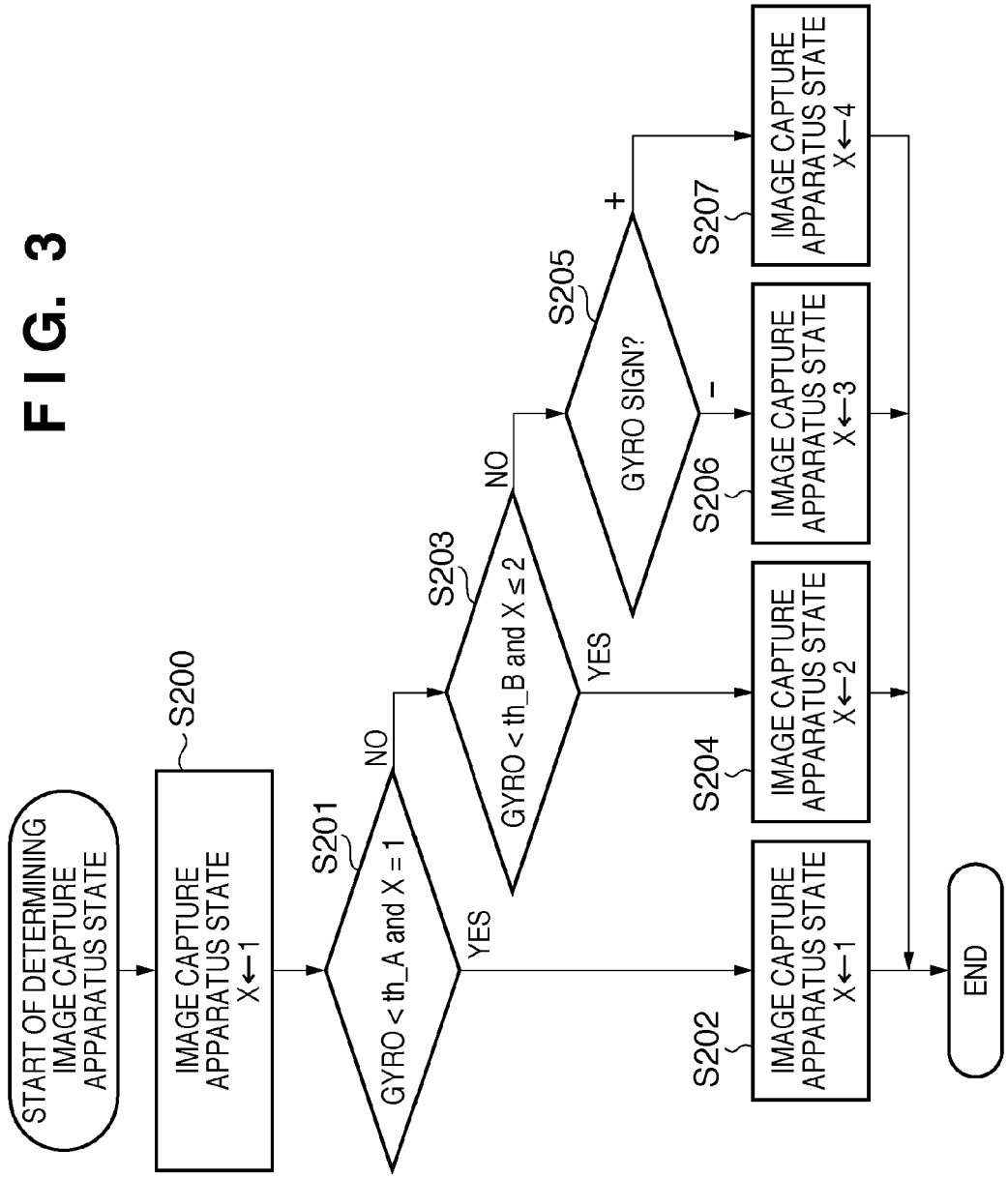
FIG. 3 is a flowchart for explaining processing in step S101.

Determination of the state of the image capture apparatus 100 in step S101 will be explained with reference to FIG. 3. FIG. 3 is a flowchart showing determination processing for the state of the image capture apparatus 100. In FIG. 3 and the following description, GYRO is a value based on an output from the angular velocity sensor 101, but may use any of the outputs from the A/D converter 103, the HPF 106, and the integrator 107. The state of the image capture apparatus 100 is given by the X value.

In the following description, only a lateral shake in the image capture apparatus 100 will be explained. Processing for a longitudinal shake is the same as that for a lateral shake, and a description thereof will not be repeated.

In step S200, the X value is set to 1. X=1 represents that the image capture apparatus 100 stands still. If GYRO is smaller than a threshold th_A and X=1 in step S201, the process shifts to step S202; if GYRO is greater than or equal to the threshold th_A or X≠1, to step S203. Note that the threshold th_A (third threshold) is a GYRO threshold used to determine whether the image capture apparatus 100 stands still.

Figure 4:
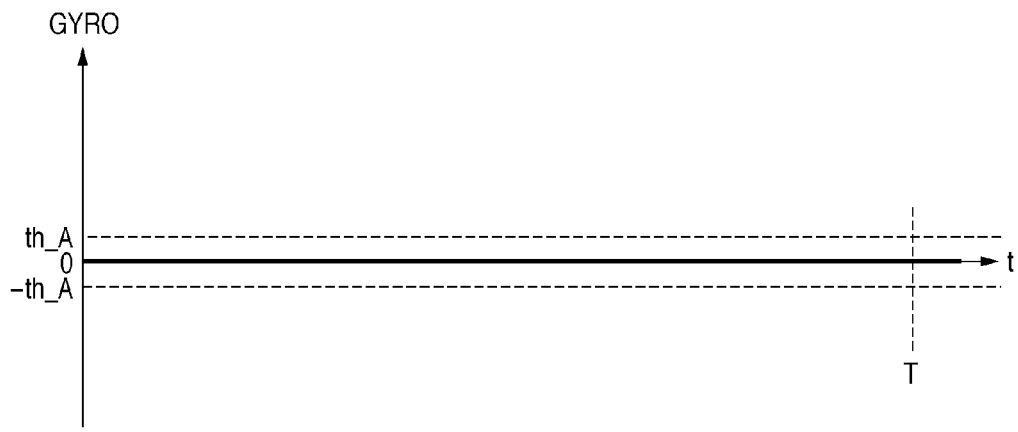
FIG. 4 is a chart exemplifying a GYRO waveform when a value GYRO based on an output from an angular velocity sensor is less than or equal to th_A during a predetermined time.

In step S202, the X value is set to 1. FIG. 4 exemplifies a GYRO waveform when the image capture apparatus 100 stands still. If GYRO is less than a threshold th_B and the X value is less than or equal to 2 in step S203, the process shifts to step S204; if GYRO is greater than or equal to the threshold th_B or the X value is larger than 2, to step S205. Note that the threshold th_B (first threshold) is a GYRO threshold used to determine whether the image capture apparatus 100 pans.

Figure 5:
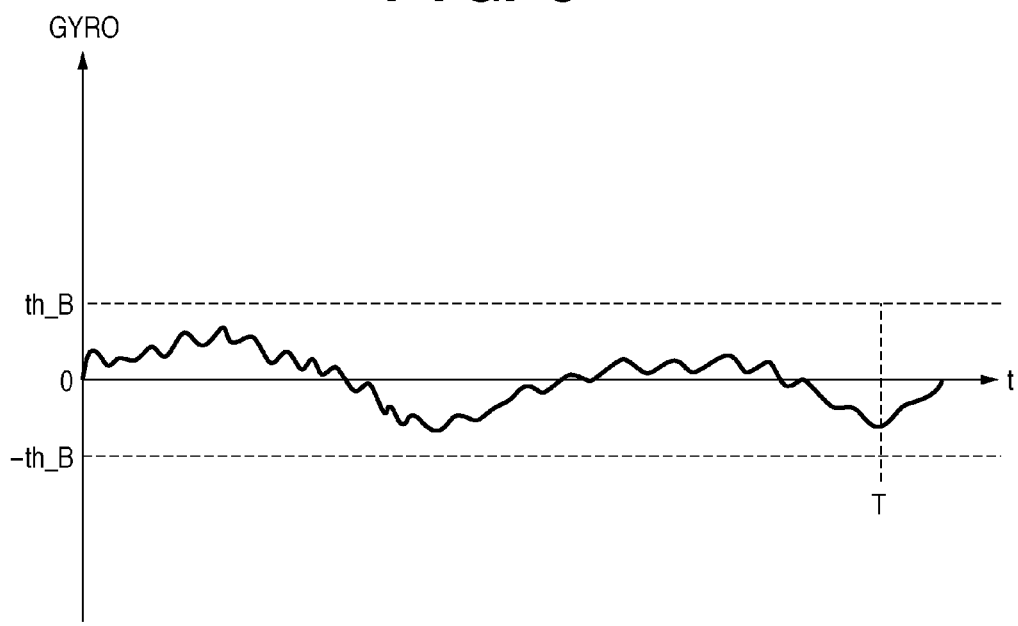
FIG. 5 is a chart exemplifying a GYRO waveform when GYRO is larger than th_A within a predetermined time and is less than or equal to th_B during the predetermined time.

In step S204, the X value is set to 2. X=2 represents a state in which the image capture apparatus shakes larger than in the still state and smaller than in the panning state, for example, a state in which the user holds the image capture apparatus with his hands and shoots a fixed point. A state as in step S204 will be referred as a fixed point shooting state. FIG. 5 exemplifies a GYRO waveform when the image capture apparatus 100 is in the fixed point shooting state.

Figure 6:
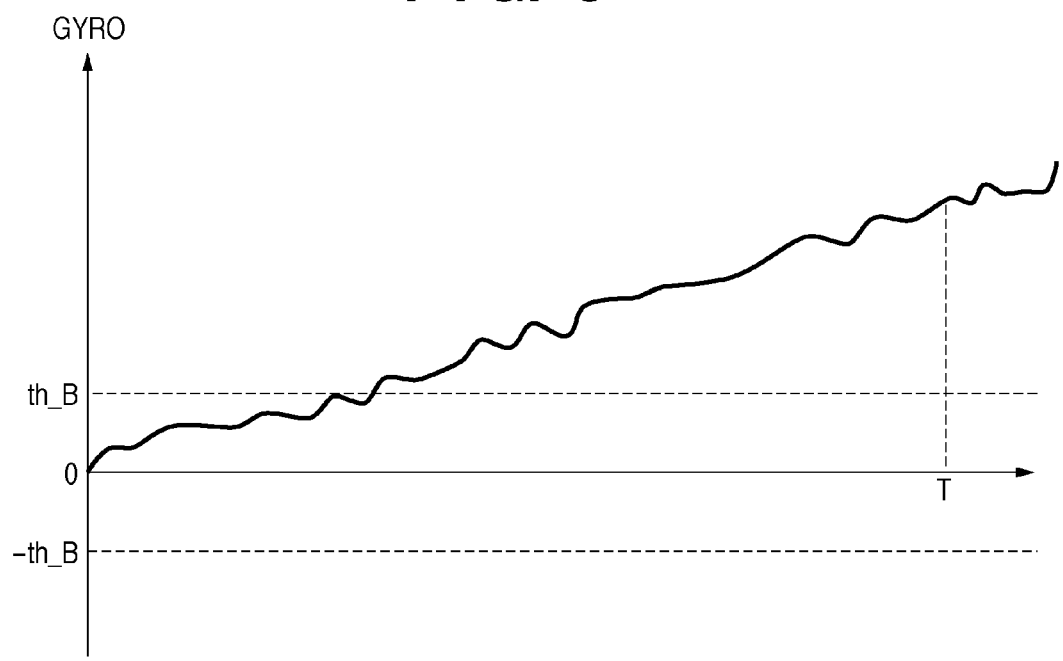
FIG. 6 is a chart exemplifying a GYRO waveform when GYRO is larger than th_B within a predetermined time.

In step S205, the sign of GYRO is determined. If GYRO is positive, the process shifts to step S206; if it is negative, to step S207. In step S206, the X value is set to 3. X=3 represents that the image capture apparatus pans and especially the panning direction is right. FIG. 6 exemplifies a GYRO waveform when the image capture apparatus 100 pans.

In step S207, the X value is set to 4. X=4 represents that the image capture apparatus pans and especially the panning direction is left. GYRO in step S207 is the same as that in step S206 except for the sign, and an illustration thereof will be omitted.

[Processing Sequence to Determine State of Captured Image]

Figure 7:
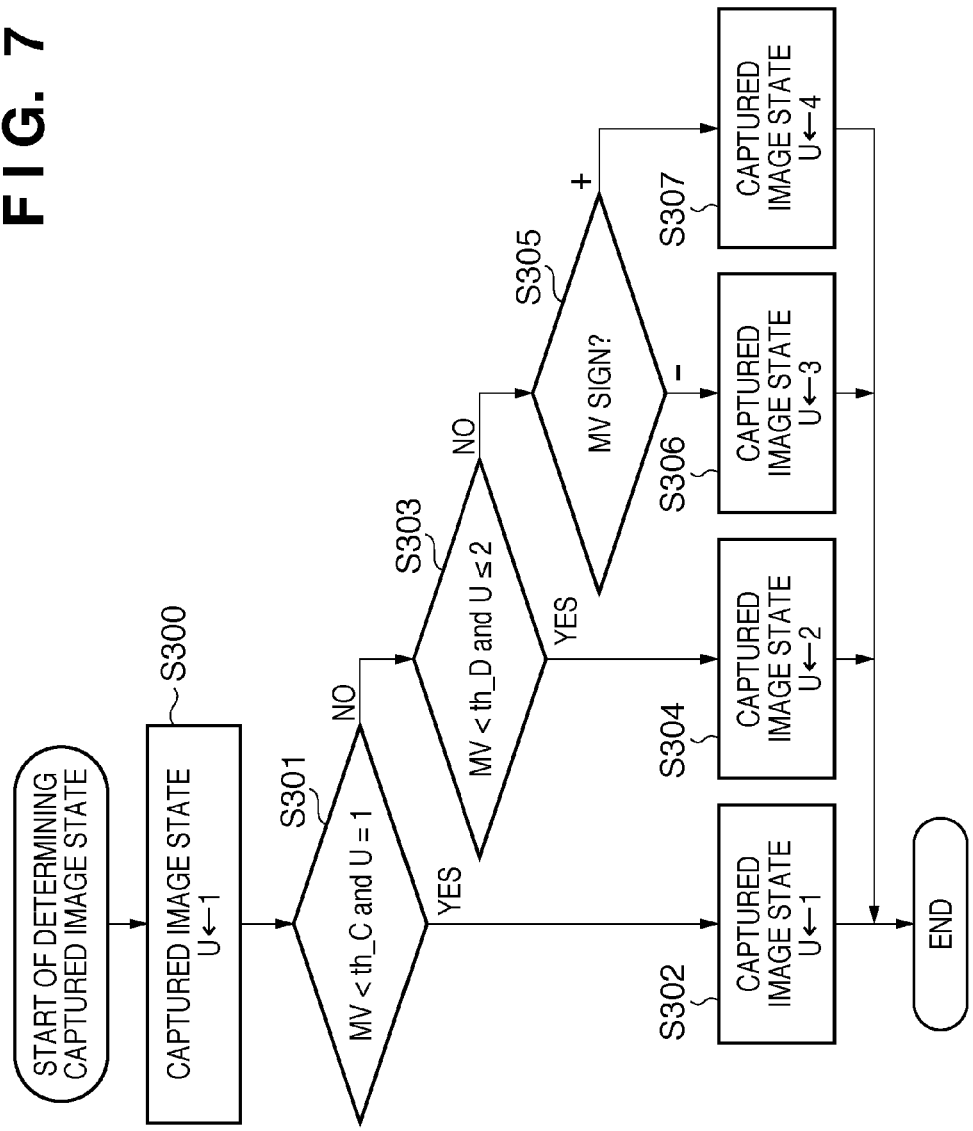
FIG. 7 is a flowchart for explaining processing in step S102 of FIG. 2.

A method of determining the state of the captured image from a value based on the motion vector in step S102 will be explained with reference to FIG. 7. FIG. 7 is a flowchart exemplifying determination processing to determine the state of the captured image from the motion vector.

In FIG. 7 and the following description, MV is a value based on a motion vector detected by the motion vector detection unit 111, but may use either of an output from the motion vector detection unit 111 or an output from the integrator 112. The state of the captured image is given by the U value. In the following description, only a lateral blur in the captured image will be explained. Processing for a longitudinal blur is the same as that for a lateral blur, and a description thereof will not be repeated.

Figure 8:
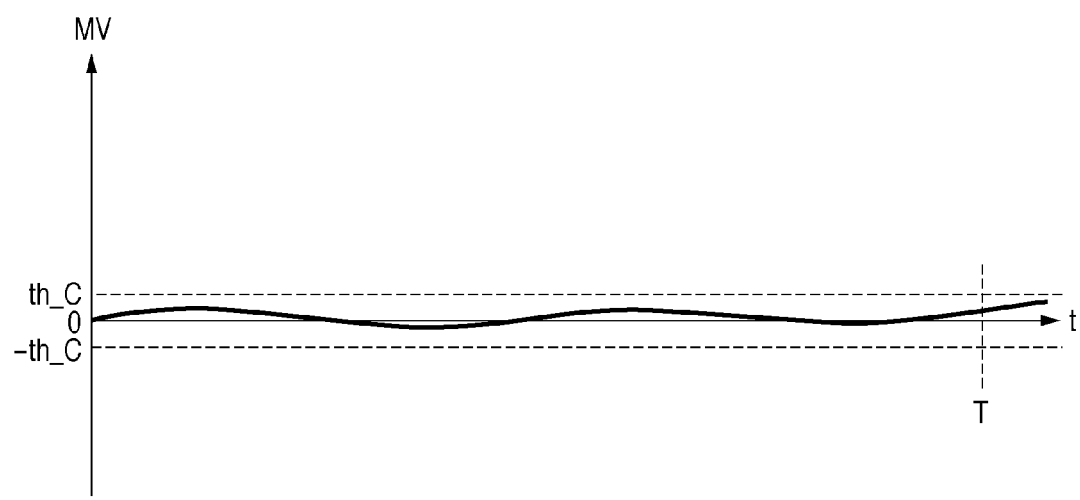
FIG. 8 is a chart exemplifying an MV waveform when a value MV based on an output from a motion vector detection unit is less than or equal to th_C during a predetermined time.

In step S300, the U value is set to 1. U=1 represents that the captured image hardly blurs. If MV is less than a threshold th_C and U=1 in step S301, the process shifts to step S302; if MV is greater than or equal to the threshold th_C or U≠1, to step S303. Note that the threshold th_C (fourth threshold) is an MV threshold used to determine whether the captured image hardly blurs. In step S302, the U value is set to 1. FIG. 8 exemplifies an MV waveform when the captured image hardly blurs.

Figure 9:
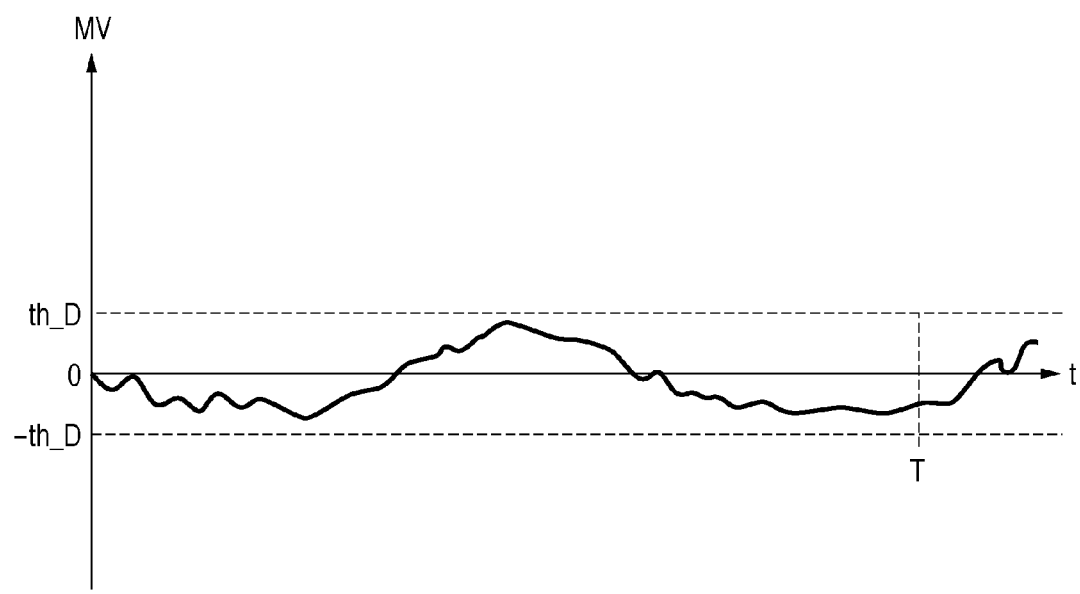
FIG. 9 is a chart exemplifying an MV waveform when MV is larger than th_C within a predetermined time and is less than or equal to th_D during the predetermined period.

If MV is less than a threshold th_D and the U value is less than or equal to 2 in step S303, the process shifts to step S304; if the integrated value of the motion vector is greater than or equal to the threshold th_D or the U value is greater than 2, to step S305. Note that the threshold th_D (second threshold) is an MV threshold used to determine whether the captured image blurs greatly. In step S304, the U value is set to 2. U=2 represents a state in which the captured image blurs relatively slightly. FIG. 9 exemplifies an MV waveform when the captured image blurs relatively slightly.

Figure 10:
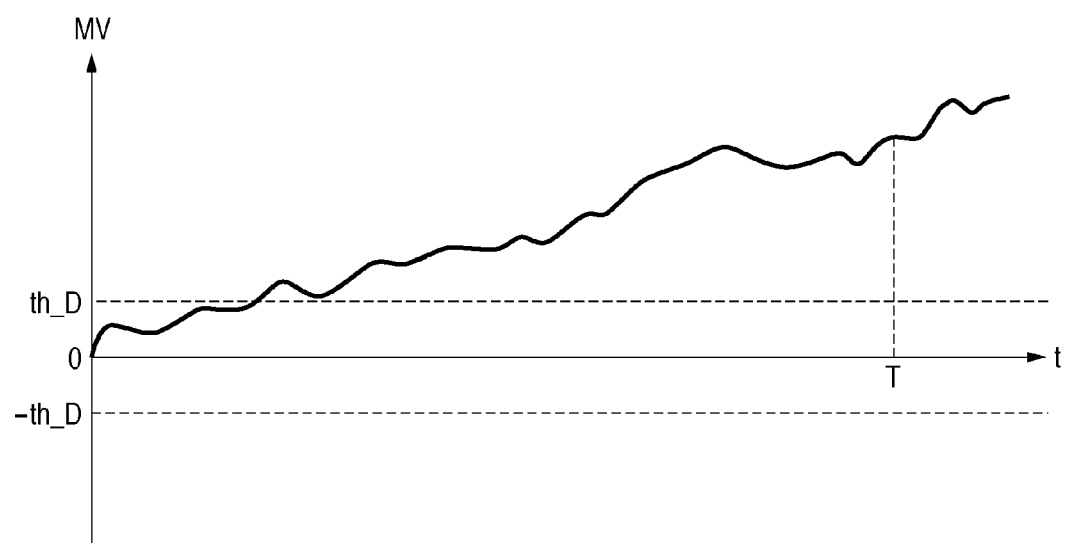
FIG. 10 is a chart exemplifying an MV waveform when MV is larger than th_D within a predetermined time.

In step S305, the sign of MV is determined. If MV is negative, the process shifts to step S306; if it is positive, to step S307. In step S306, the U value is set to 3. U=3 represents that the captured image blurs relatively greatly. For U=3, the direction of a blur generated in the captured image is left. This is the direction of a blur generated in the captured image when the image capture apparatus 100 pans rightward. FIG. 10 exemplifies an MV waveform when the captured image blurs greatly.

In step S307, the U value is set to 4. U=4 represents that the captured image blurs greatly. For U=4, the direction of a blur generated in the captured image is right. This is the direction of a blur generated in the captured image when the image capture apparatus 100 pans leftward. The integrated value of the motion vector in step S307 is the same as MV in step S306 except for the sign, and an illustration thereof will be omitted.

[Shooting State Determination Processing]

A shooting state for each combination of steps S101 and S102 will be explained with reference to FIGS. 12A to 16B. FIG. 11 shows a list of shooting state determination results. X is the state of the image capture apparatus, and U is the state of a blur of the captured image.

(1) For X=1 and U=1

Since the image capture apparatus 100 stands still and the captured image hardly blurs, it can be determined that the object is at rest in this shooting state. FIG. 12A exemplifies this shooting state. FIG. 12B shows a captured image in this state. In this state, the state of the image capture apparatus 100 and that of the captured image coincide with each other, and the motion vector indicates a remaining blur after blur correction of the image capture apparatus 100.

(2) For X=1 and U=2 to 4

Since the image capture apparatus 100 stands still and the captured image blurs, it can be determined that the object is moving in this shooting state. FIG. 13A exemplifies this shooting state. FIG. 13B shows a captured image in this state. The difference between U=2 to 4 is in the magnitude and direction of movement of the object, and an illustration of the difference will be omitted. In this state, the state of the image capture apparatus 100 and that of the captured image do not coincide with each other, and the motion vector does not indicate a remaining blur after blur correction of the image capture apparatus 100. The image capture apparatus 100 stands still.

(3) For X=2 and U=1 to 2

The image capture apparatus 100 is in the fixed point shooting state, and the captured image slightly or hardly blurs. From this, it can be determined that the object is at rest in this shooting state. This shooting state and captured image are almost the same as those in FIGS. 12A and 12B, and an illustration thereof will be omitted. The difference between U=1 and U=2 arises from the fact that blur correction is performed more accurately for U=1 than for U=2. In this state, the state of the image capture apparatus 100 and that of the captured image coincide with each other, and the motion vector indicates a remaining blur after blur correction of the image capture apparatus 100.

(4) For X=2 and U=3 to 4

The image capture apparatus 100 is in the fixed point shooting state, and the captured image blurs greatly. It can therefore be determined that the object is moving in this shooting state. This shooting state and captured image are almost the same as those in FIGS. 13A and 13B, and an illustration thereof will be omitted. The difference between U=3 and U=4 is in the direction of movement of the object. In this state, the state of the image capture apparatus 100 and that of the captured image do not coincide with each other, and the motion vector does not indicate a remaining blur after blur correction of the image capture apparatus 100. The image capture apparatus 100 is not at rest.

(5) For X=3 and U=1 to 2

Figure 14B:
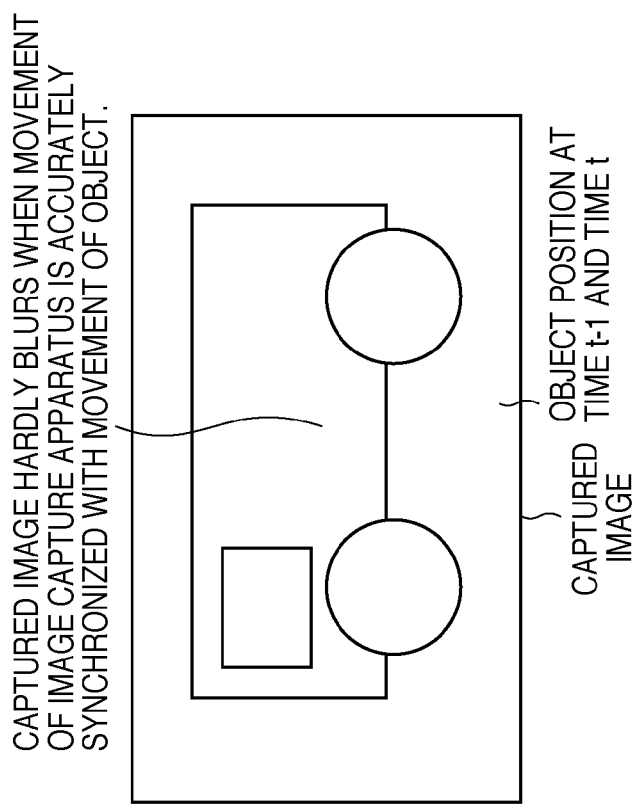
FIGS. 14A and 14B are views showing a shooting state and captured image when the image capture apparatus shakes greatly, the captured image blurs slightly, and the object is moving.
Figure 14A:
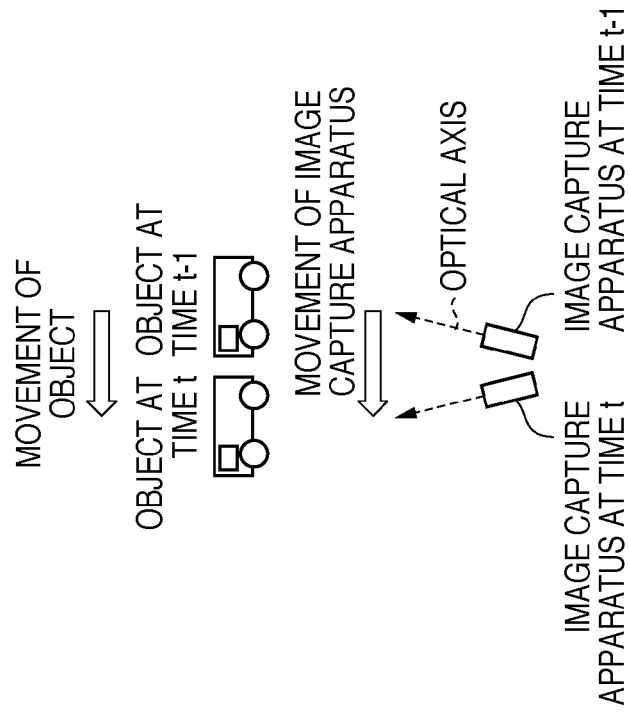

The image capture apparatus 100 pans, and the captured image slightly or hardly blurs. It can be determined that the image capture apparatus is being moved in synchronization with the moving object in this shooting state. FIG. 14A exemplifies this shooting state. FIG. 14B shows a captured image in this state. The difference between U=1 and U=2 arises from the fact that an image is captured by synchronizing the movement of the image capture apparatus to that of the object more accurately for U=1 than for U=2, and an illustration of the difference will be omitted. In this state, the state of the image capture apparatus 100 and that of the captured image do not coincide with each other, and the motion vector does not indicate a remaining blur after blur correction of the image capture apparatus 100. The image capture apparatus 100 is not at rest.

(6) For X=3 and U=3

The image capture apparatus 100 pans, the captured image blurs greatly, and the panning direction of the image capture apparatus 100 and the blur direction of the captured image match each other. Thus, it can be determined that the image capture apparatus 100 is moved to capture a still object in this shooting state. FIG. 15A exemplifies this shooting state. FIG. 15B shows a captured image in this state. In this state, the state of the image capture apparatus 100 and that of the captured image coincide with each other, and the motion vector indicates a remaining blur after blur correction of the image capture apparatus 100.

(7) For X=3 and U=4

The image capture apparatus 100 pans the captured image blurs greatly, and the panning direction of the image capture apparatus 100 and the blur direction of the captured image do not match each other. It can be determined that the movement of the object and that of the image capture apparatus 100 differ from each other in this shooting state. FIG. 16A exemplifies this shooting state. FIG. 16A shows that the object moves faster than the image capture apparatus which tracks it. FIG. 16B shows a captured image in this state. In this state, the state of the image capture apparatus 100 and that of the captured image do not coincide with each other, and the motion vector does not indicate a remaining blur after blur correction of the image capture apparatus 100. Also, the image capture apparatus 100 is not at rest.

(8) For X=4 and U=1 to 2

The image capture apparatus 100 pans, and the captured image slightly or hardly blurs. It can be determined that the image capture apparatus 100 is being moved in synchronization with the moving object in this shooting state. This shooting state is the same as that for X=3 and U=1 to 2 except for the panning direction, and a description thereof will not be repeated.

(9) For X=4 and U=3

The image capture apparatus 100 pans, the captured image blurs greatly, and the panning direction of the image capture apparatus 100 and the blur direction of the captured image do not match each other. It can be determined that the movement of the object and that of the image capture apparatus 100 differ from each other in this shooting state. This shooting state is the same as that for X=3 and U=4 except for the panning direction, and a description thereof will not be repeated.

(10) For X=4 and U=4

The image capture apparatus 100 pans, the captured image blurs greatly, and the panning direction of the image capture apparatus 100 and the blur direction of the captured image match each other. It can be determined that the image capture apparatus 100 is moved to capture a still object in this shooting state. This shooting state is the same as that for X=3 and U=3 except for the panning direction, and a description thereof will not be repeated.

The above-described (1) to (10) are applied to steps S106 to S110 in the flowchart of FIG. 2 as follows. More specifically, in the case of (1), (3), (6), and (10), the process advances from step S106 to step S107 to select (reference value calculation method 1). In the case of (2), the process advances from step S108 to step S109 to select (reference value calculation method 2). In the case of (4), (5), (7), (8), and (9), the process advances from step S108 to S110 to select (reference value calculation method 3).

(Second Embodiment)

Figure 17:
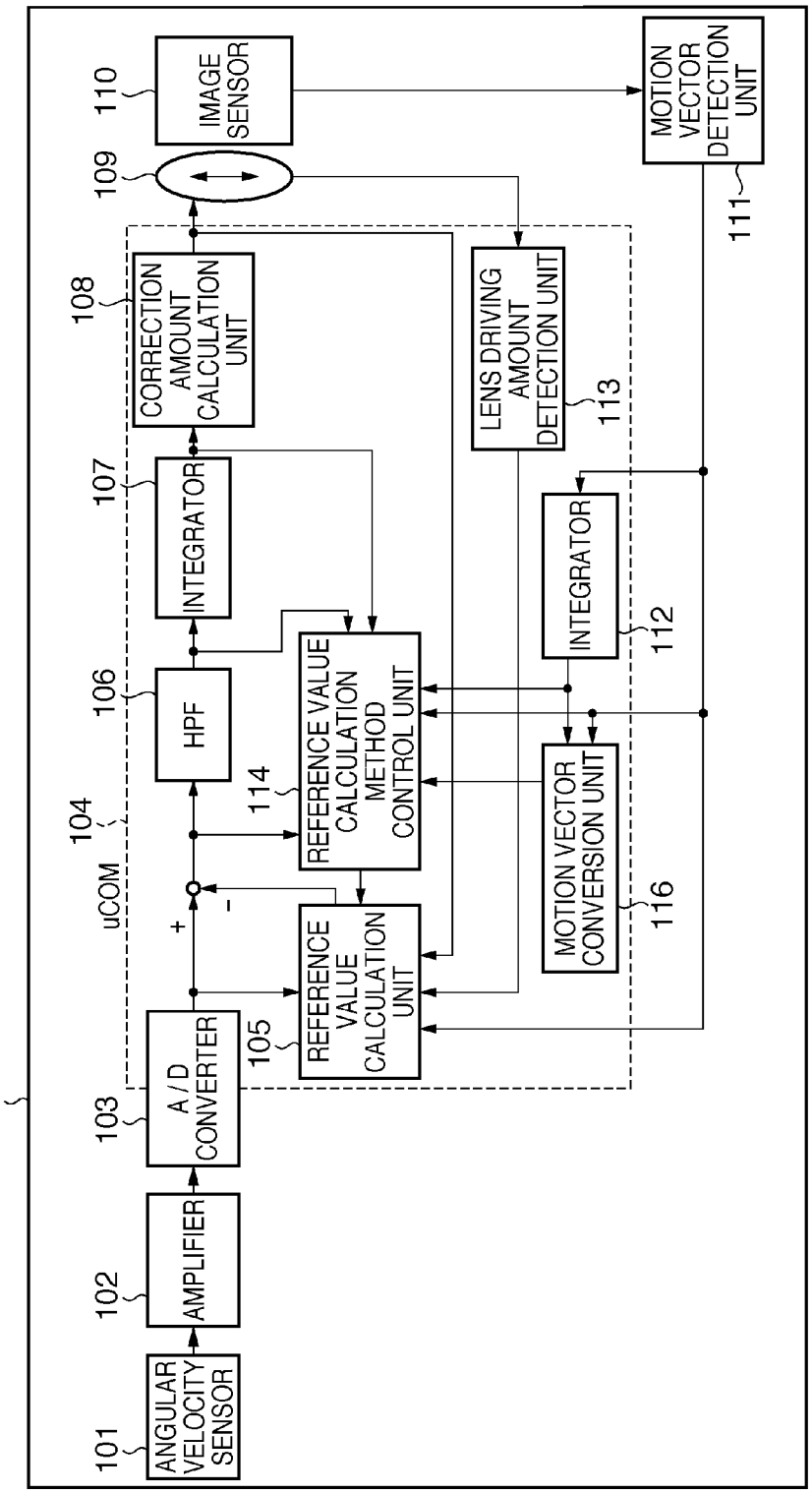
FIG. 17 is a block diagram showing the arrangement of an image capture apparatus according to the second embodiment.

The second embodiment of the present invention will be described. FIG. 17 is a block diagram showing the arrangement of an image capture apparatus according to the second embodiment of the present invention. The block diagram of FIG. 17 is the same as that of FIG. 1 except that a motion vector conversion unit 116 is added to FIG. 1, an output from the motion vector conversion unit 116 is added to the input of a reference value calculation method control unit 114, and the operation of the reference value calculation method control unit 114 is changed. Thus, a description of the image capture apparatus except for the changes will not be repeated.

The motion vector conversion unit 116 converts a value MV based on an output from a motion vector detection unit 111 into the same scale as that of an output from an angular velocity sensor 101. MV is an output from the motion vector detection unit 111 or an output from an integrator 112.

An MV conversion method in the motion vector conversion unit 116 will be explained with reference to FIG. 18. MV is converted into a motion amount on the image sensor. Since the magnitude of MV is given by the number of pixels, MV is multiplied by the distance between pixels on the image sensor. In FIG. 18, dist is the motion amount of MV on the image sensor. dist is given by equation (6):

$$\text{dist} = f \times \tan\theta \quad (f: \text{focal length}) \tag{6}$$

θ in equation (6) is a value obtained by converting MV into the same scale as that of an output from the angular velocity sensor 101. θ can be calculated by equation (7):

$$\theta = \arctan(\text{dist}/f) \tag{7}$$

The reference value calculation method control unit 114 determines the state of the captured image in more detail by adding determination using scale-converted MV' (=θ) to the captured image state determination described in the first embodiment. Using the captured image state determination result allows to set more detailed states, compared to shooting state determination processing. Note that processing is the same as that in the first embodiment except for a processing sequence to determine the state of the captured image and shooting state determination processing, and a description thereof will not be repeated.

[Processing Sequence to Determine State of Captured Image]

Figure 19:
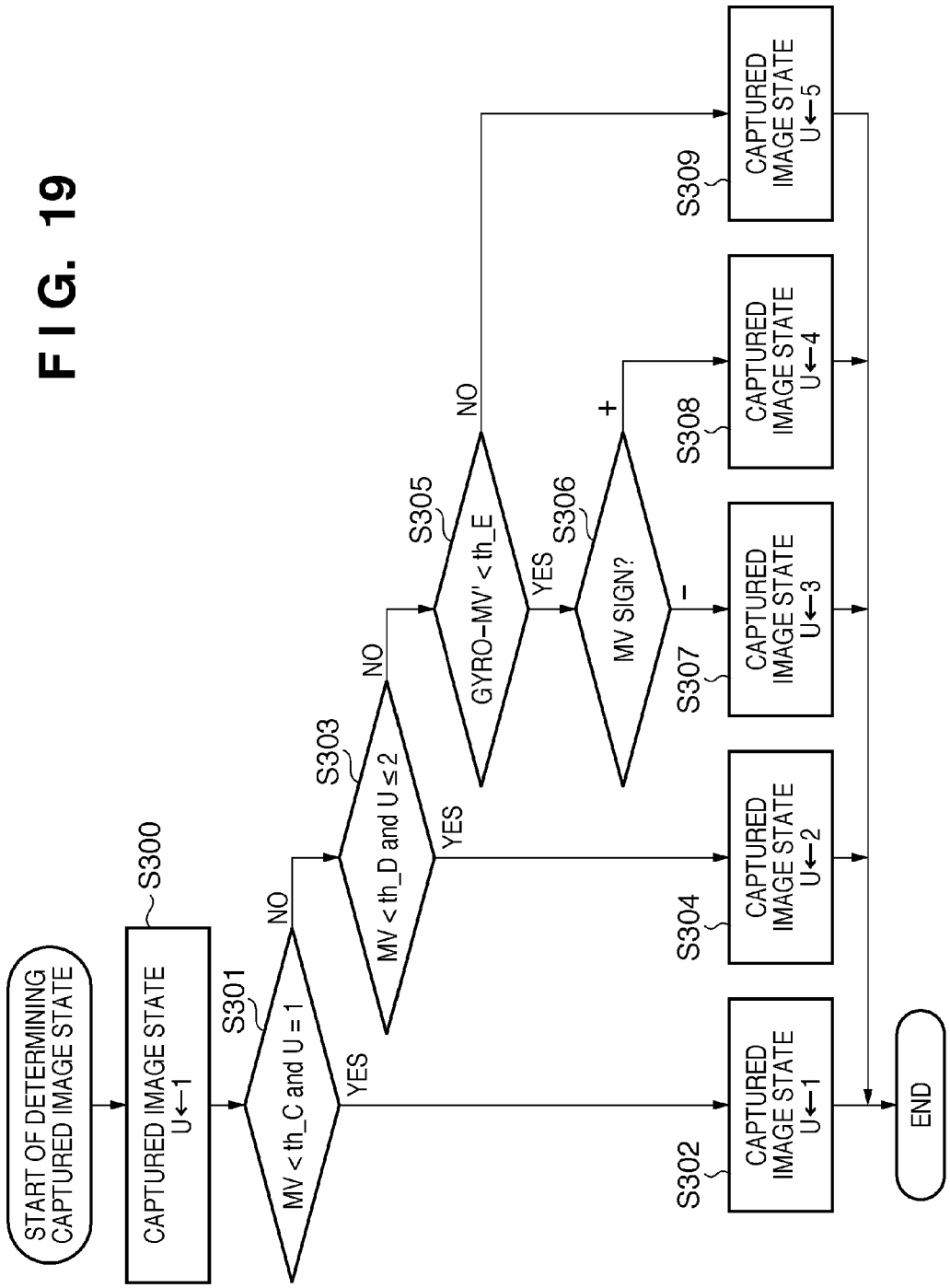
FIG. 19 is a flowchart for explaining processing in step S101 of FIG. 2.

The processing sequence to determine the state of the captured image from a value based on the motion vector will be explained with reference to FIG. 19. Steps S300 to S304 are the same as those in the first embodiment, and a description thereof will not be repeated. In FIG. 19 and the following description, GYRO is a value based on an output from the angular velocity sensor 101, but may use any of the outputs from an A/D converter 103, an HPF 106, and an integrator 107.

Also in FIG. 19 and the following description, MV is a value based on a motion vector detected by the motion vector detection unit 111, but may use either an output from the motion vector detection unit 111 or an output from the integrator 112. In FIG. 19 and the following description, MV' is a scale-converted MV.

If the difference between GYRO and MV' is less than a threshold th_E in step S305, the process shifts to step S306; if it is greater than or equal to the threshold th_E, to step S307. Note that the threshold th_E (fifth threshold) is used to determine whether the difference between GYRO and MV' is sufficiently small.

The processing in step S305 determines whether the magnitude of a shake of an image capture apparatus 100 that is detected by the angular velocity sensor 101 substantially coincides with the magnitude of a shake of the image capture apparatus that is determined from the captured image.

In step S306, the sign of MV is determined. If MV is negative, the process shifts to step S307; if it is positive, to step S308. In step S307, the U value is set to 3. U=3 represents that the captured image blurs greatly, and the magnitude of a shake of the image capture apparatus that is determined from the blur of the captured image is almost equal to the magnitude of a shake of the image capture apparatus 100 that is detected by the angular velocity sensor 101.

Figure 20:
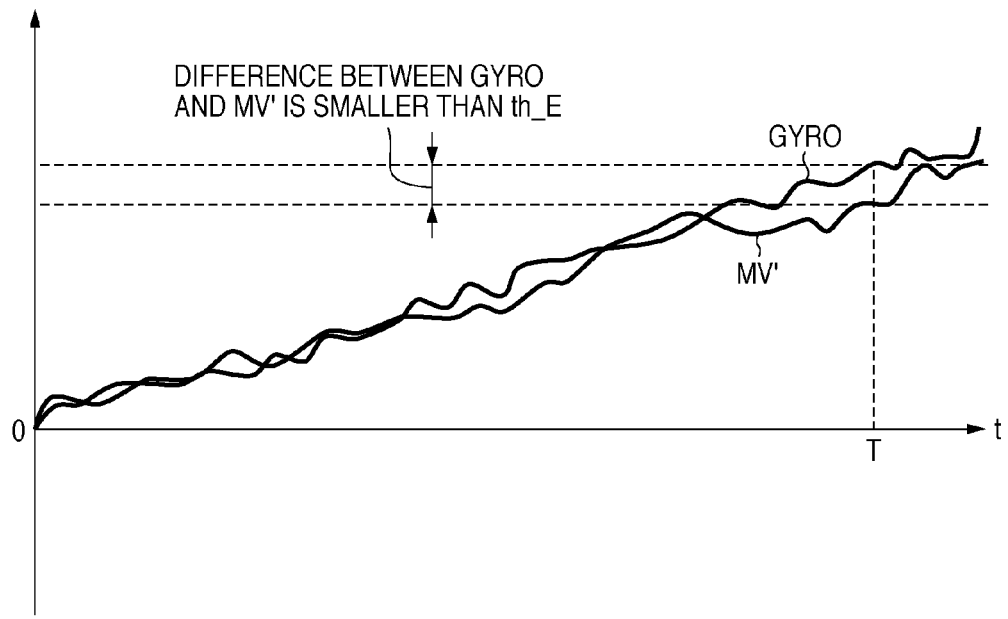
FIG. 20 is a chart exemplifying MV' and GYRO waveforms when the difference between a value MV' obtained by converting MV into the same scale as that of GYRO, and GYRO is less than or equal to th_E during a predetermined period.

For U=3, the direction of a blur generated in the captured image is left. This is the direction of a blur generated in the captured image when the image capture apparatus 100 pans rightward. FIG. 20 exemplifies MV' and GYRO waveforms in step S307.

In step S308, the U value is set to 4. U=4 represents that the captured image blurs greatly, and the magnitude of a shake of the image capture apparatus that is determined from the blur of the captured image is almost equal to the magnitude of a shake of the image capture apparatus 100 that is detected by the angular velocity sensor 101.

For U=4, the direction of a blur generated in the captured image is right. This is the direction of a blur generated in the captured image when the image capture apparatus 100 pans leftward. Step S308 is the same as step S307 except for the sign of MV', and an illustration thereof will be omitted.

Figure 21:
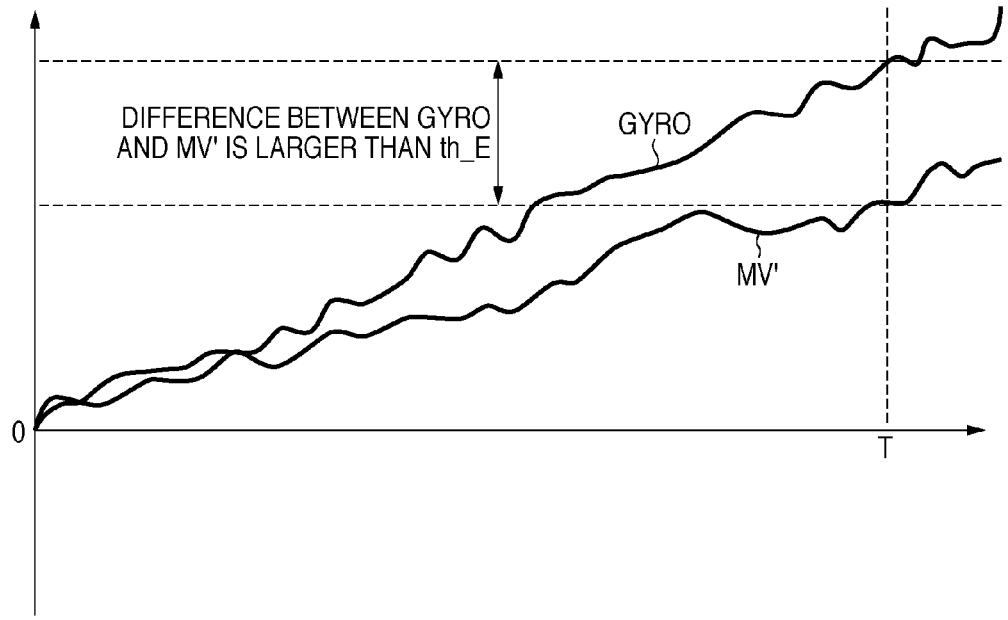
FIG. 21 is a chart exemplifying MV' and GYRO waveforms when the difference between the value MV' obtained by converting MV into the same scale as that of GYRO, and GYRO is larger than th_E within a predetermined period.

In step S309, the U value is set to 5. U=5 represents that the captured image blurs greatly, and the magnitude of the shake is different from the magnitude of a shake of the image capture apparatus 100 that is detected by the angular velocity sensor 101. FIG. 21 exemplifies MV' and GYRO waveforms in step S309.

[Shooting State Determination Processing]

A shooting state for each combination of steps S101 and S102 will be explained. X is the state of the image capture apparatus, and U is the state of a blur of the captured image.

FIG. 22 shows a list of shooting state determination results. Shooting states for U=1 to 2 are the same as those in the first embodiment, and a description thereof will not be repeated.

(1) For X=1 and U=3 to 5

Since the image capture apparatus 100 stands still and the captured image blurs, it can be determined that the object is moving. This shooting state is the same as that shown in FIG. 13A, and the captured image in this state is the same as that shown in FIG. 13B. The difference between U=3 to 5 is in the magnitude and direction of movement of the object, and an illustration of the difference will be omitted. In this state, the state of the image capture apparatus 100 and that of the captured image do not coincide with each other, and the motion vector does not indicate a remaining blur after blur correction of the image capture apparatus 100. The image capture apparatus 100 stands still.

(2) For X=2 and U=3 to 5

Since the image capture apparatus 100 is in the fixed point shooting state and the captured image blurs, it can be determined that the object is moving in this shooting state. This shooting state and captured image are almost the same as those in FIGS. 13A and 13B, and an illustration thereof will be omitted. The difference between U=3 to 5 is in the magnitude and direction of movement of the object. In this state, the state of the image capture apparatus 100 and that of the captured image do not coincide with each other, and the motion vector does not indicate a remaining blur after blur correction of the image capture apparatus 100. The image capture apparatus 100 is in the fixed point shooting state.

(3) For X=3 and U=3

The image capture apparatus 100 pans, the captured image blurs greatly, and the shake of the image capture apparatus 100 and the blur of the captured image match each other in both magnitude and direction. It can therefore be determined that the image capture apparatus 100 is moved to capture a still object in this shooting state. This shooting state is the same as that shown in FIG. 15A, and the captured image in this state is the same as that shown in FIG. 15B. In this state, the state of the image capture apparatus 100 and that of the captured image coincide with each other, and the motion vector indicates a remaining blur after blur correction of the image capture apparatus 100.

(4) For X=3 and U=4

The image capture apparatus 100 pans, the captured image blurs greatly, and the shake of the image capture apparatus 100 and the blur of the captured image match each other in magnitude but not in direction. It can be determined that the movement of the object and that of the image capture apparatus 100 differ from each other in this shooting state. This shooting state is the same as that shown in FIG. 16A, and the captured image in this state is the same as that shown in FIG. 16B. Particularly, the magnitude of a shake of the image capture apparatus 100 and that of a blur of the captured image coincide with each other. In this state, the state of the image capture apparatus 100 and that of the captured image do not coincide with each other, and the motion vector does not indicate a remaining blur after blur correction of the image capture apparatus 100. The image capture apparatus 100 is not at rest.

(5) For X=3 and U=5

The image capture apparatus 100 pans, the captured image blurs greatly, and the shake of the image capture apparatus 100 and the blur of the captured image do not match each other in magnitude. It can be determined that the movement of the object and that of the image capture apparatus 100 differ from each other in this shooting state. FIG. 16A exemplifies this shooting state. FIG. 16A shows that the object moves faster than the image capture apparatus which tracks it. FIG. 16B shows a captured image in this state. In this state, the state of the image capture apparatus 100 and that of the captured image do not coincide with each other, and the motion vector does not indicate a remaining blur after blur correction of the image capture apparatus 100. The image capture apparatus 100 is not at rest.

(6) For X=4 and U=3

The image capture apparatus 100 pans, the captured image blurs greatly, and the shake of the image capture apparatus 100 and the blur of the captured image match each other in magnitude but not in direction. It can be determined that the movement of the object and that of the image capture apparatus 100 differ from each other in this shooting state. This shooting state is the same as that shown in FIG. 16A, and the captured image in this state is the same as that shown in FIG.

16B. Especially, the magnitude of a shake of the image capture apparatus 100 and that of a blur of the captured image coincide with each other. In this state, the state of the image capture apparatus 100 and that of the captured image do not coincide with each other, and the motion vector does not indicate a remaining blur after blur correction of the image capture apparatus 100. The image capture apparatus 100 is not at rest.

(7) For X=4 and U=4

The image capture apparatus 100 pans, the captured image blurs greatly, and the shake of the image capture apparatus 100 and the blur of the captured image match each other in both magnitude and direction. Hence, it can be determined that the image capture apparatus 100 is moved to capture a still object in this shooting state. This shooting state is the same as that shown in FIG. 15A, and the captured image in this state is the same as that shown in FIG. 15B. In this state, the state of the image capture apparatus 100 and that of the captured image coincide with each other, and the motion vector indicates a remaining blur after blur correction of the image capture apparatus 100.

(8) For X=4 and U=5

The image capture apparatus 100 pans, the captured image blurs greatly, and the shake of the image capture apparatus 100 and the blur of the captured image do not match each other in magnitude. It can be determined that the movement of the object and that of the image capture apparatus 100 differ from each other in this shooting state. FIG. 16A exemplifies this shooting state. FIG. 16A shows that the object moves faster than the image capture apparatus which tracks it. FIG. 16B shows a captured image in this state. In this state, the state of the image capture apparatus 100 and that of the captured image do not coincide with each other, and the motion vector does not indicate a remaining blur after blur correction of the image capture apparatus 100. The image capture apparatus 100 is not at rest.

The above-described (1) to (8) are applied to steps S106 to S110 in the flowchart of FIG. 2 as follows. More specifically, in the case of (3) and (7), the process advances from step S106 to step S107 to select (reference value calculation method 1). In the case of (1), the process advances from step S108 to step S109 to select (reference value calculation method 2). In the case of (2), (4), (5), (6), and (8), the process advances from step S108 to S110 to select (reference value calculation method 3).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-179006, filed Aug. 9, 2010, which is hereby incorporated by reference herein in its entirety.

What is claimed is:

1. An image capture apparatus comprising:
   an image capture unit which captures an object image to acquire a captured image;
   a shake detection unit which detects a shake of the image capture apparatus;
   a reference value calculation unit which calculates, by a plurality of calculation methods, a reference value for an output from said shake detection unit when no shake is applied to the image capture apparatus;
   an image blur correction unit which corrects an image blur of the captured image based on a difference between an output from said shake detection unit and the reference value;
   a motion vector detection unit which detects a motion vector from the captured image;
   a determination unit which determines whether the motion vector indicates a movement of an object; and
   a control unit which controls one of the calculation methods of the reference value and the reference value,
   wherein said reference value calculation unit calculates the reference value using both an output from said shake detection unit and an output from said motion vector detection unit as one of the plurality of calculation methods, and
   when said determination unit determines that the motion vector indicates the movement of the object, said control unit controls not to calculate the reference value using the output from said shake detection unit and the output from said motion vector detection unit.

2. The apparatus according to claim 1, wherein when the output from said shake detection unit is smaller than a first threshold during a predetermined period and the output from said motion vector detection unit is smaller than a second threshold during the predetermined period, said control unit calculates the reference value using the output from said shake detection unit and the output from said motion vector detection unit.

3. The apparatus according to claim 1, wherein
   said reference value calculation unit calculates the reference value using the output from said shake detection unit as one of the plurality of calculation methods, and
   when the output from said shake detection unit is smaller than a third threshold smaller than a first threshold during a predetermined period and the output from said motion vector detection unit exceeds a fourth threshold smaller than a second threshold within the predetermined period, said control unit calculates the reference value using the output from said shake detection unit.

4. The apparatus according to claim 1, wherein when the output from said shake detection unit exceeds a first threshold within a predetermined period, the output from said motion vector detection unit exceeds a second threshold within the predetermined period, and a shake direction of the image capture apparatus that is determined from a sign of the output from said shake detection unit and a shake direction of the image capture apparatus that is determined from a sign of the motion vector match each other, said control unit calculates the reference value using the output from said shake detection unit and the output from said motion vector detection unit.

5. The apparatus according to claim 3, wherein
   said reference value calculation unit uses, as the reference value, a reference value calculated in the past as one of the plurality of calculation methods, and when a difference between values obtained by converting the output from said shake detection unit and the output from said motion vector detection unit into the same scale is larger than a fifth threshold during the predetermined period, a reference value calculated in the past is used as the reference value.

6. The apparatus according to claim 1, wherein
   said reference value calculation unit uses, as the reference value, a reference value calculated in the past as one of the plurality of calculation methods, and
   when said determination unit determines that the motion vector indicates the movement of the object, said control unit controls to use, as the reference value, a reference value calculated in the past.

7. The apparatus according to claim 6, wherein when the output from said shake detection unit exceeds a first threshold within a predetermined period, the output from said motion vector detection unit exceeds a second threshold within the predetermined period, and a shake direction of the image capture apparatus that is determined from a sign of the output from said shake detection unit and a shake direction of the image capture apparatus that is determined from a sign of the motion vector do not match each other, said control unit uses, as the reference value, the reference value calculated in the past.

8. The apparatus according to claim 6, wherein when the output from said shake detection unit exceeds a first threshold within a predetermined period and the output from said motion vector detection unit is smaller than a second threshold during the predetermined period, said reference value calculation unit uses, as the reference value, the reference value calculated in the past.

9. The apparatus according to claim 6, wherein when the output from said shake detection unit is smaller than a first threshold during a predetermined period and the output from said motion vector detection unit exceeds a second threshold within the predetermined period, said reference value calculation unit uses, as the reference value, the reference value calculated in the past.

10. A method of controlling an image capture apparatus including an image capture unit which captures an object image to acquire a captured image, and an image blur correction unit for image stabilization, comprising:

detecting a shake of the image capture apparatus;

calculating a reference value as a value output from a shake detection unit when no shake is applied to the image capture apparatus;

driving an image blur correction unit based on a difference between an output from the shake detection unit and the reference value;

detecting a motion vector from the captured image;

determining whether the motion vector indicates a movement of an object; and controlling one of a calculation methods of the reference value and the reference value, wherein the reference value is calculated using both an output from the shake detection unit and an output from the motion vector detection unit as one of a plurality of calculation methods, and when the motion vector is determined to indicate the movement of the object, calculation of the reference value using the output from the shake detection unit and the output from the motion vector detection unit is controlled not to be performed.

* * * * *